United States Patent
Park et al.

(10) Patent No.: US 8,430,459 B2
(45) Date of Patent: Apr. 30, 2013

(54) HYDRAULIC BRAKE SYSTEM

(75) Inventors: Seung Young Park, Gyeonggi-do (KR); Seong Ho Choi, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 0 days.

(21) Appl. No.: 13/193,002

(22) Filed: Jul. 28, 2011

(65) Prior Publication Data

US 2012/0025598 A1 Feb. 2, 2012

(30) Foreign Application Priority Data

Jul. 28, 2010 (KR) .................. 10-2010-0072658

(51) Int. Cl.
*B60T 8/34* (2006.01)

(52) U.S. Cl.
USPC ....................................... 303/113.5; 303/9.75

(58) Field of Classification Search .............. 303/9.62, 303/9.63, 9.75, 87, 113.1–113.5, 186, 187, 303/DIG. 11
See application file for complete search history.

(56) References Cited

U.S. PATENT DOCUMENTS

| | | | |
|---|---|---|---|
| 3,851,930 A * | 12/1974 | Grosseau | 303/117.1 |
| 4,989,924 A * | 2/1991 | Toda et al. | 303/113.1 |
| 5,628,550 A * | 5/1997 | Zaviska et al. | 303/115.4 |
| 6,082,830 A * | 7/2000 | Volz et al. | 303/113.4 |
| 6,135,578 A * | 10/2000 | Clar et al. | 303/114.3 |
| 6,196,365 B1 * | 3/2001 | Gomi | 188/352 |
| 6,220,675 B1 * | 4/2001 | Steffes | 303/116.2 |
| 6,422,662 B1 * | 7/2002 | Haas | 303/155 |
| 6,464,307 B1 * | 10/2002 | Yoshino | 303/11 |
| 6,652,039 B1 * | 11/2003 | Shull et al. | 303/113.2 |
| 7,093,911 B2 * | 8/2006 | Hool et al. | 303/113.5 |
| 7,309,112 B2 | 12/2007 | Isono | |
| 2002/0043875 A1 * | 4/2002 | Braun | 303/166 |

FOREIGN PATENT DOCUMENTS

| | | |
|---|---|---|
| JP | 5-86737 | 11/1993 |
| JP | 11-240436 | 9/1999 |
| JP | 2010-095023 | 4/2010 |

* cited by examiner

*Primary Examiner* — Christopher Schwartz
(74) *Attorney, Agent, or Firm* — McDermott Will & Emery LLP

(57) ABSTRACT

Disclosed is a hydraulic brake system capable of reducing periodic pressure pulsation caused by operation of a piston. The hydraulic brake system includes a master cylinder generating braking hydraulic pressure by operation of a brake pedal, a wheel brake provided to each of front right and left wheels and rear right and left wheels of a vehicle to receive the braking hydraulic pressure from the master cylinder to generate braking force, a solenoid valve provided to each of an inlet and an outlet of each of the wheel brakes to control flow of the braking hydraulic pressure, a low pressure accumulator temporarily storing oil, which is ejected from the wheel brakes during operation of the solenoid valves, a pump compressing the oil stored in the low pressure accumulator such that the oil is ejected towards the wheel brakes or the master cylinder as needed, and an orifice disposed near an outlet port of the pump. Further, a damper unit is disposed between the outlet port of the pump and the orifice to reduce pressure pulsation caused by operation of the piston, thereby improving product reliability through noise reduction during brake control.

5 Claims, 2 Drawing Sheets

HYDRAULIC BRAKE SYSTEM

CROSS REFERENCE TO RELATED APPLICATION

This application claims priority from and the benefit of Korean Patent Application No. 10-2010-0072658, filed on Jul. 28, 2010, which is hereby incorporated by reference for all purposes as if fully set forth herein.

BACKGROUND

1. Technical Field

The present disclosure relates to a hydraulic brake system, and more particularly, to a hydraulic brake system capable of reducing pressure pulsation caused by operation of a piston.

2. Description of the Related Art

A vehicle is necessarily fitted with a brake system. Recently, various kinds of brake systems have been suggested to obtain stronger and more stable braking force. Such brake systems include an anti-lock brake system (ABS) that prevents slippage of a wheel during braking, a brake traction control system (BTCS) that prevents slippage of a driven wheel upon rapid start or rapid acceleration of a vehicle, a vehicle dynamic control system (VDC) that is a combination of the anti-lock brake and traction control systems and maintains a stable driving state of a vehicle by controlling pressure of a brake liquid, etc.

Such a hydraulic brake system includes a master cylinder for generating a desired pressure for braking, a plurality of solenoid valves for controlling braking hydraulic pressure transmitted to wheel brakes of a vehicle, a low pressure accumulator for temporarily storing oil, a hydraulic motor and pumps for pumping out the oil temporarily stored in the low pressure accumulator, orifices for reducing pressure pulsation of the oil pumped by the pumps, an electronic control unit (ECU) for electrically controlling the solenoid valves and the pumps, and the like. Further, a valve assembly of the solenoid valves, the accumulator, the pumps, the hydraulic motor, and the like are compactly installed in an aluminum hydraulic block (modulator block). The ECU is connected to the hydraulic block and includes an ECU housing which receives a coil assembly of the solenoid valves and a circuit board.

In the hydraulic brake system described above, although the orifice disposed near an outlet port of each pump reduces pressure pulsation caused by operation of the pump in a process of multiplying braking pressure, there is difficulty achieving complete reduction of the pressure pulsation since the orifice is provided to control a cross-sectional area of a flow passage for the purpose of damping reduction.

Further, pressure pulsation may be reduced by increasing the number of pistons of the pump. In this case, however, there is a problem of increase in manufacturing costs through increase of the weight and volume of the motor for improving performance of the motor. Moreover, the peak of pressure pulsation continuously generated due to operation of the pump can act as a source of noise of the hydraulic brake system.

BRIEF SUMMARY

The present disclosure is directed to solving the problems of the related art, and an aspect of the present disclosure provides a hydraulic brake system capable of reducing periodic pressure pulsation resulting from operation of a pump.

In accordance with an aspect of the present disclosure, a hydraulic brake system includes: a master cylinder generating braking hydraulic pressure by operation of a brake pedal; a wheel brake provided to each of front right and left wheels and rear right and left wheels of a vehicle and receiving the braking hydraulic pressure from the master cylinder to generate braking force; a solenoid valve provided to each of an inlet and an outlet of each of the wheel brakes to control flow of the braking hydraulic pressure; a low pressure accumulator temporarily storing oil, which is ejected from the wheel brakes during operation of the solenoid valves; a pump compressing the oil stored in the low pressure accumulator such that the oil is ejected towards the wheel brakes or the master cylinder as needed; and an orifice disposed near an outlet port of the pump, wherein a damper unit is disposed between the outlet port of the pump and the orifice.

The hydraulic brake system further includes: a first hydraulic circuit connecting a first port of the master cylinder to two wheel brakes to control transmission of hydraulic pressure; and a second hydraulic circuit connecting a second port of the master cylinder to the remaining two wheel brakes to control transmission of hydraulic pressure. Here, the damper unit allows main flow passages of the first and second hydraulic circuits to communicate with each other therethrough.

The damper unit may include a cylinder through which the main flow passages communicate with each other, a piston disposed within the cylinder to reciprocate therein, and springs disposed at opposite sides of the piston to support the piston.

DETAILED DESCRIPTION

Hereinafter, exemplary embodiments of the present disclosure will be described in detail with reference to the accompanying drawings.

Figure 1:
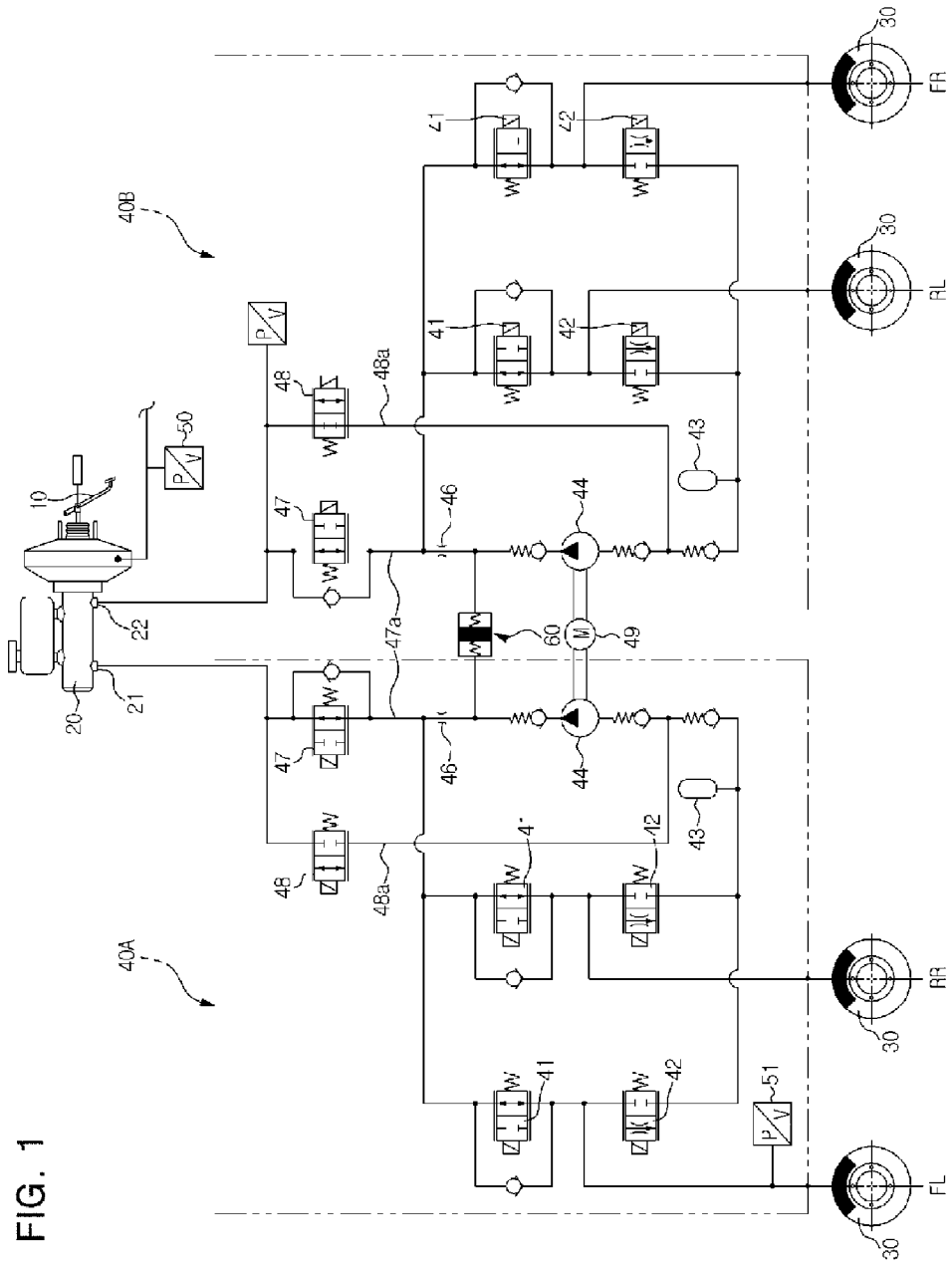
FIG. 1 is a diagram of a hydraulic brake system in accordance with an exemplary embodiment of the present disclosure.

Referring to FIG. 1, a hydraulic brake system according to an exemplary embodiment of the present disclosure includes a brake pedal 10 receiving operational force of a driver, a brake booster 11 multiplying pedal force of the brake pedal 10 using a difference between a vacuum and atmospheric pressure, a master cylinder 20 generating pressure by the brake booster 11, a first hydraulic circuit 40A connecting a first port 21 of the master cylinder 20 to two wheel brakes 30 (or wheel cylinders) to control transmission of hydraulic pressure, and a second hydraulic circuit 40B connecting a second port 22 of the master cylinder 20 to the remaining two wheel brakes 30 to control transmission of hydraulic pressure. The first and second hydraulic circuits 40A, 40B are compactly installed in a hydraulic block (not shown).

Each of the first and second hydraulic circuits 40A, 40B includes a plurality of solenoid valves 41, 42, each of which controls braking hydraulic pressure transmitted to two wheel brakes 30, a pump 44 which suctions oil discharged from the wheel brakes 30 or from the master cylinder 20 to pump the oil, a low pressure accumulator 43 which temporarily stores the oil discharged from the wheel brakes 30, an orifice 46 which reduces pressure pulsation caused by hydraulic pressure of the oil pumped by the pump 44, and an assistant flow passage 48a which guides the oil from the master cylinder 20 into an inlet of the pump 44 in a TCS mode.

The plurality of solenoid valves 41, 42 is located upstream and downstream of the wheel brakes 30. Specifically, the solenoid valves 41, 42 are divided into a normal open-type solenoid valve 41 which is placed upstream of each of the wheel brakes 30 and is normally maintained in an open state, and a normal closed-type solenoid valve 42 which is placed downstream of each of the wheel brakes 30 and is normally maintained in a closed state. Opening/closing the solenoid valves 41, 42 is controlled by an electronic control unit (ECU, not shown), which detects the speed of the vehicle through a wheel speed sensor provided to each of the wheels. When the normal closed type solenoid valve 42 is opened by pressure reduction braking, oil is discharged from the wheel brakes 30 and temporarily stored in the low pressure accumulator 43.

The pump 44 is driven by a motor 45 and suctions the oil stored in the low pressure accumulator 43 to eject the oil towards the orifice 46, so that hydraulic pressure is transmitted towards the wheel brakes 30 or the master cylinder 20.

Figure 2:
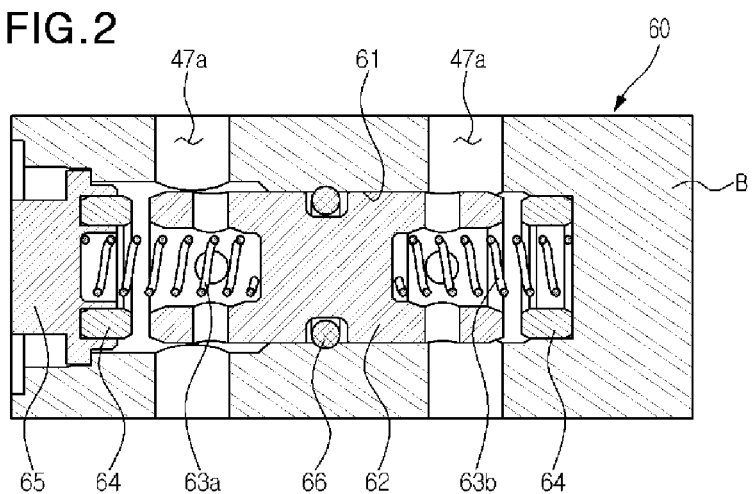
FIG. 2 is a cross-sectional view of a damper unit of the hydraulic brake system in accordance with the exemplary embodiment of the present disclosure.

Further, a damper unit 60 is disposed between the outlet port of the pump 44 and the orifice 46 to reduce pressure pulsation caused by operation of the pump 44. The damper unit 60 is configured to allow main flow passages 47a of the first and hydraulic circuits 40A, 40B installed in the hydraulic block to communicate with each other therethrough. In other words, as shown in FIG. 2, the damper unit 60 includes hydraulic block B having a cylinder 61 through which the respective main flow passages 47a of the first and second hydraulic circuits 40A, 40B communicate with each other, a piston 62 disposed within the cylinder 61 to reciprocate therein, springs 63a, 63b located at opposite sides of the piston 62 to support the piston 62, guides 64 restricting operational displacement of the piston 62, and an assembly cap 65. Reference numeral 66 indicates a sealing member. The damper unit 60 may control pressure pulsation of the first and second hydraulic circuits 40A, 40B using a single cylinder 61, thereby facilitating installation and assembly while improving energy efficiency of the vehicle.

Further, the main flow passage 47a connecting the master cylinder 20 to the outlet of each pump 44 is provided with a normal open-type solenoid valve 47 for traction control (hereinafter, TC valve). The TC valve 47 is normally maintained in an open state, allowing braking hydraulic pressure generated by the master cylinder 20 in general braking operation through the brake pedal 10 to be transmitted to the wheel brakes 30 through the main flow passage 47a.

Further, the assistant flow passage 48a is bifurcated from the main flow passage 47a to guide the oil to be suctioned from the master cylinder 20 towards the inlet of the pump 44, and is provided with a shuttle valve 48 which allows the oil to flow only towards the inlet of the pump 44. The shuttle valve 48 operated by electric power is located at the middle of the assistant flow passage 48a and is normally closed but is opened in the TCS mode.

The brake booster 11 is provided with a pressure sensor which detects a vacuum in the brake booster and atmospheric pressure, and front left and right wheels FL, FR and rear left and right wheels RL, RR are respectively provided with wheel pressure sensors for detecting actual braking pressure. These pressure sensors are electrically connected to the ECU to be controlled thereby.

Next, operation and effects of the hydraulic brake system according to the exemplary embodiment will be described with reference to FIGS. 1 and 2.

First, a driver steps on the brake pedal 10 to decelerate during vehicle driving or to maintain a stopped state of the vehicle. Then, the brake booster 11 multiplies pedal force, with which the master cylinder 20 generates a significant braking hydraulic pressure. The braking hydraulic pressure is transmitted to the front wheels FR, FL and the rear wheels RR, RL through the solenoid valves 41, thereby performing braking. Then, when the driver gradually or completely removes their foot from the brake pedal 10, oil pressure in each of the wheel brakes 30 returns to the master cylinder 20 through the solenoid valves 41, thereby reducing braking force or completely releasing braking operation.

On the other hand, although regular half-sine waves of pressure pulsation are generated in the hydraulic brake system due to a pair of pumps 44 operated to have a phase difference of 180 degrees by a single drive motor 49 during braking, the regular half-sine waves of pressure pulsation are reduced by the damper unit 60.

That is, oil flowing through the outlet port of each of the pumps 44 is supplied to the damper unit 60, the cross-sectional area of which is changed by the piston 62 and the springs 63a, to provide equilibrium of pressure between the hydraulic circuits 40A, 40B, thereby substantially reducing pressure pulsation.

Accordingly, the regular half-sine waves of pressure pulsation are completely removed through the damper unit 60 and the orifices 46, and uniform oil pressure is transmitted to the master cylinder 20 or the solenoid valves 41.

As such, in the hydraulic bake system according to the exemplary embodiments, the damper unit is disposed between the outlet port of the pump and the orifice to reduce pressure pulsation during operation of the pump such that noise is reduced when controlling the hydraulic brake system, thereby enhancing driver comfort.

The various embodiments described above can be combined to provide further embodiments. Aspects of the embodiments can be modified, as necessary, to employ concepts of the various patents, applications and publications to provide yet further embodiments. These and other changes can be made to the embodiments in light of the above-detailed description. In general, in the following claims, the terms used should not be construed as limiting the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hydraulic brake system, comprising:
   a master cylinder configured to generate a braking hydraulic pressure when a brake pedal operates;
   a wheel brake disposed on each of front right and left wheels and rear right and left wheels of a vehicle and configured to receive the braking hydraulic pressure from the master cylinder to generate a braking force;
   a solenoid valve disposed on each of an inlet and an outlet of each of the wheel brakes to control a flow of the braking hydraulic pressure;
   a low pressure accumulator configured to temporarily store oil, which is ejected from the wheel brakes during an operation of the solenoid valves;
   a pump configured to compress the oil stored in the low pressure accumulator such that the oil is ejected towards the wheel brakes or the master cylinder;
   an orifice disposed near an outlet port of the pump; and
   a damper unit disposed between the outlet port of the pump and the orifice,
   wherein the damper unit comprises:
      a damper cylinder through which a first main flow passage of the hydraulic pressure communicates with a second main flow passage of the hydraulic pressure, a piston disposed damper to reciprocate therein, springs disposed at opposite sides of the piston to support the piston, and guides disposed within the damper cylinder and restricting reciprocal displacement of the piston.

2. The hydraulic brake system of claim 1, further comprising:

a first hydraulic circuit having the first main flow passage of the hydraulic pressure and connecting a first port of the master cylinder to two of the wheel brakes to control transmission of the hydraulic pressure; and a second hydraulic circuit having the second main flow passage of the hydraulic pressure and connecting a second port of the master cylinder to the remaining two of the wheel brakes to control transmission of the hydraulic pressure, wherein the damper unit allows the first main flow passage of the first hydraulic circuit to communicate with the second main flow passage of the second hydraulic circuit through the damper cylinder of the damper unit.

3. The hydraulic brake system of claim 2, wherein the damper unit further comprises sealing member disposed in the damper cylinder to seal between the first hydraulic circuit and the second hydraulic circuit.

4. The hydraulic brake system of claim 1, wherein:

the piston of the damper unit has a plurality of holes through which upper portions of the first and second main flow passages communicate with lower portions of the first and second flow passages.

5. The hydraulic brake system of claim 1, wherein:

one end of each spring is disposed in an inner surface of the piston and the other end of each spring is disposed in an inner surface of the guides.

\* \* \* \* \*